United States Patent Office 3,048,893
Patented Aug. 14, 1962

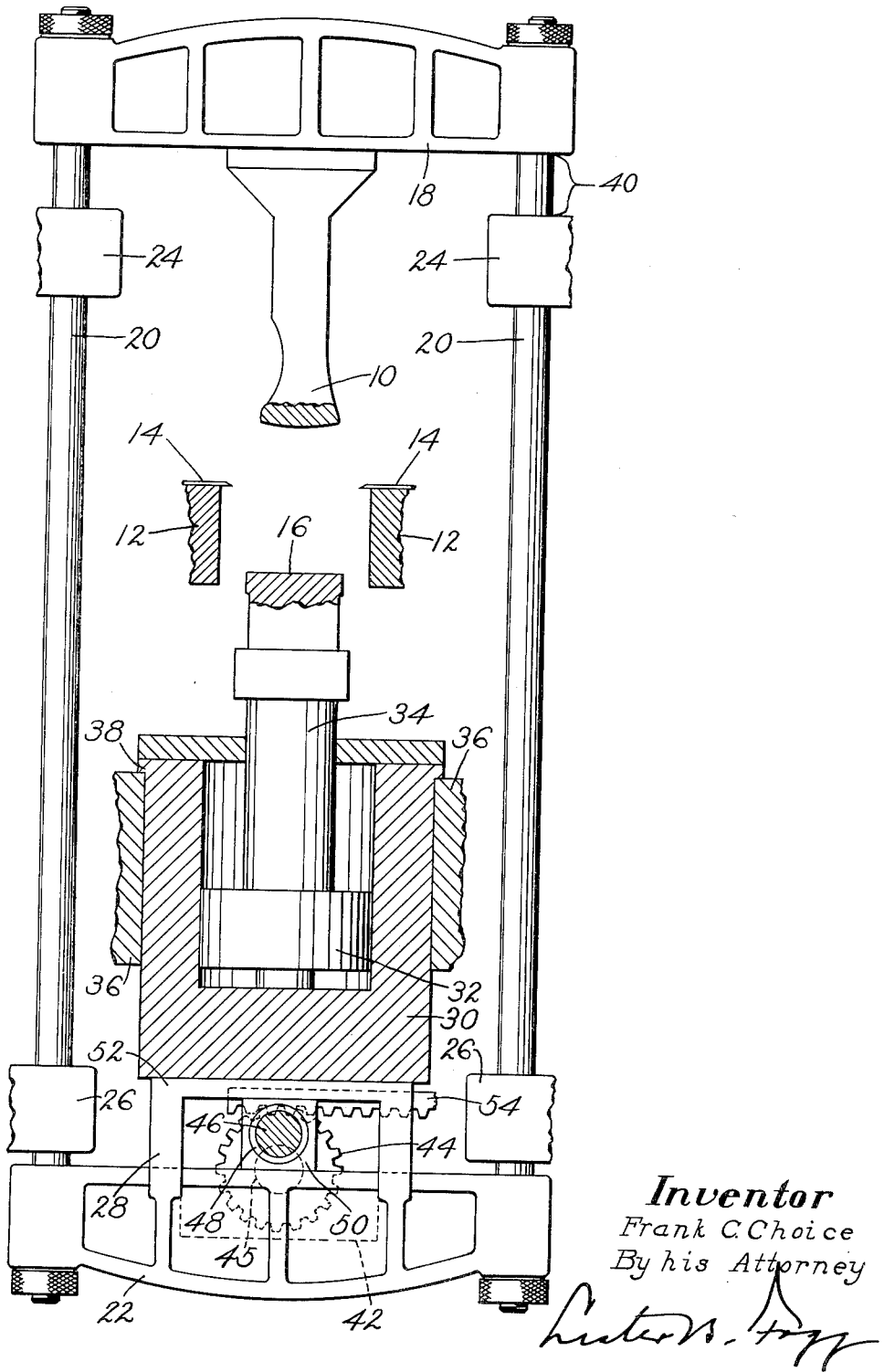

3,048,893
MOLDING MACHINES FOR PRESSING AND
VULCANIZING PLASTIC MATERIALS
Frank Coleman Choice, Leicester, England, assignor to
United Shoe Machinery Corporation, Boston, Mass., a
corporation of New Jersey
Filed Oct. 4, 1960, Ser. No. 60,390
3 Claims. (Cl. 18—17)

This invention relates to molding machines and is herein illustrated in its application to machines for vulcanizing outsoles onto shoe bottoms. A machine of this type is disclosed, for example, in United States Letters Patent No. 2,922,191, granted January 26, 1960, on an application filed in the name of George C. Barton.

Machines of this type are provided with a shoe support, usually arranged above the molding station, and a mold assembly comprising two side mold members movable toward each other into mold closing position and a bottom mold member movable upwardly between the side mold members to apply vulcanizing pressure to a charge in the mold cavity. The upward pressure applied by the bottom mold member causes the charge to fill the mold cavity and to be pressed forcibly against the bottom of a shoe on the support. The side mold members are provided with welt plates, so called, which extend inwardly slightly from the side mold members and permit the formation of a sole having a suitable marginal extension. In the operation of machines of this type the shoe support is moved downwardly into the molding station whereupon the side mold members are closed. During the latter part of the closing movement of the side mold members, the edges of the welt plates are impressed into the shoe upper material and thus complete the closure of the mold cavity. During the upward movement of the bottom mold member, to apply vulcanizing pressure to the charge in the mold cavity, it is desirable that the shoe support remain in a fixed position since any upward movement of the shoe support in response to the vulcanizing pressure applied by the bottom mold member would cause a corresponding upward movement of the shoe upper relatively to the welt plates with consequent damage to the upper on an area which would be exposed in the finished shoe.

It is an object of the present invention to provide, in a machine of the type above described, an organization in which the shoe support is reliably held against upward movement during the vulcanizing operation.

To this end the invention provides an organization in which the vulcanizing pressure applied by the bottom mold member is balanced by an equivalent downward pressure applied to the structure on which the shoe support is mounted. In the illustrated organization vulcanizing pressure is provided by a pressure fluid operated piston mounted in a cylinder slidably mounted in a frame section and arranged to be supported by the frame section when the machine is at rest. In the operation of the machine a suitable actuator moves the shoe supporting assembly downwardly into a position in which it is supported by an extension of the machine frame. During the latter part of its operation the actuator lifts the cylinder thereby to transfer its support from the frame section on which it normally rests to the shoe supporting assembly. Inasmuch as the cylinder remains in this position during the vulcanizing cycle, the downward pressure exerted against the cylinder is taken by the shoe supporting assembly itself and consequently there can be no movement of the assembly relatively to the cylinder in the vulcanizing operation. Furthermore, since the extension of the frame which supports the assembly is so located that it engages a portion of the assembly proximate to the shoe form, any strains or stresses created in the assembly by the vulcanizing pressure cannot cause any movement of the supported shoe relatively to the welt plates.

In the illustrated organization the actuator which imparts downward movement to the shoe supporting assembly and upward movement to the cylinder is in the form of a crank mechanism journaled in bearings in a structure depending from the cylinder. An eccentric bearing block mounted on the crank mechanism is arranged for sliding movement in a horizontal guideway in a lower cross head forming a part of the shoe supporting assembly. In the first instance the crank mechanism operates to move the shoe supporting assembly downwardly into a position in which it is supported by the frame. During the latter part of its operation the crank mechanism moves the cylinder upwardly so that its support is transferred from the frame section on which it is normally mounted to the shoe supporting assembly.

The invention will now be described with reference to the accompanying drawing and pointed out in the appended claims.

The drawing is a front elevation partly in section on a plane common to the axis of the bottom mold cylinder illustrating somewhat schematically a machine embodying the features of the present invention.

The invention is illustrated in the drawing as incorporated in a hydraulically operated machine for vulcanizing outsoles onto the bottoms of lasted shoes. For mounting a lasted shoe for the vulcanizing operation, the illustrated machine is provided with a shoe form identified by the numeral 10. For forming the peripheral contour of an outsole, the machine is provided with two side mold members 12, each having a weld plate 14 secured to its upper surface. The bottom contour of the sole is formed by a bottom mold member 16 having a peripheral contour the same as that defined by the closed side mold members. The shoe form 10 is mounted on a carriage which, in the illustrated organization, comprises an upper cross head 18, a lower cross head 22 and parallel vertical shafts 20 interconnecting the two cross heads. As shown in the drawing the shoe form 10 is mounted in depending relation on the central portion of the upper cross head 18. The upper portions of the shafts 20 are slidably mounted in bearings formed in extensions 24 of the machine frame and similarly the lower portions of the shafts are mounted for sliding movement in bearings formed in extensions 26 of the frame. Formed integrally with the cross head 22 is an upstanding structure 28 having a cross head 52 which is in contiguous relation to the bottom of a cylinder 30 when the machine is at rest, as shown in the drawing. Extending upwardly from a piston 32 in the cylinder 30 is a rod 34, the upper extremity of which is constructed to provide a suitable mounting for the bottom mold member 16. The cylinder 30 is mounted for sliding movement in a bearing formed in a section 36 of the machine frame. In the rest position of the machine the cylinder 30 is so arranged that a flange 38 extending outwardly from its upper extremity engages the upper surface of the frame section 36 while the base of the cylinder is in contiguous relation to the platform provided by the structure 28. In this position, the shoe form 10 is elevated relatively to the side mold members 12 which are separated from each other. In this arrangement of the shoe form, a space 40, of measured extent, exists between the cross head 18 and the frame extensions 24, said space corresponding to the downward movement required to bring the shoe form 10 into the molding station.

The illustrated shoe form 10 is advanced into the molding station by downward movement of the assembly comprising the cross heads 18 and 22 and the vertical shafts 20, such downward movement being effected by mechanism now to be described. The cylinder 30 is provided with bearing members herein illustrated as two parallel depending extensions, one of which is shown in the drawing and identified by the numeral 42. These extensions are located, respectively, forwardly and rearwardly of the upstanding structure 28. Each of these extensions is bored to provide bearings for an actuator herein illustrated as a crank mechanism comprising a pair of pinions interconnected by an eccentric shaft and having fixed thereto concentric shafts extending in opposite directions therefrom into the bearings in said extensions. Only one of the pinions is illustrated in the drawings, this being the pinion 44 fixed to the shaft 45 at the rear of the upstanding structure 28, the pinion not shown being located in front of said structure. The eccentric shaft interconnecting the pinions is identified by the numeral 46. Said eccentric shaft has a bearing in a sleeve 48 fixed in a bearing block 50 slidably mounted in a horizontal guideway provided by the top of the cross head 22 and the bottom surface of the cross head 52 of the upstanding structure 28. For actuating the crank mechanism, a rack member 54 is arranged to mesh with the pinion 44.

When the machine is at rest the assembly comprising the bottom mold member 16, the piston 32, the cylinder 30, the two cross heads 18 and 22, the two vertical shafts 20 and the shoe form 10, is supported in the position illustrated in the drawing by the engagement of the flange 38 with the frame section 36, the shoe form being then in its elevated position and the bottom mold member 16 being at the limit of its downward or retracting movement. With the parts so arranged the eccentric shaft 46 is at the top of its stroke, as shown in the drawing. The downward movement of the shoe form is effected by movement of the rack 54 to the left as seen in the drawing. Such movement of the rack causes counterclockwise rotation of the pinions and consequent downward movement of the eccentric shaft 46 and the bearing block 50 mounted thereon. The downward movement of the bearing block 50 causes like downward movement of the assembly comprising the shoe form 10, the cross heads 18 and 22, and the two shafts 20. Before the pinions have completed 180° of rotation to bring the bearing block to the lower extremity of its movement, the cross head 18 engages the extensions 24 of the machine frame, thus terminating the downward movement of said assembly and bringing the shoe form 10 into the molding station. During the remainder of the 180° of rotation of the pinions the eccentric shaft 46 serves as a fulcrum on which the pinions rotate to elevate the cylinder 30, thus causing a separation of the flange 38 from the upper surface of the frame section 36 so that the weight of the cylinder is taken solely by the cross head 22 which itself is supported by means of the shafts 20 and the cross head 18 upon the extensions 24 of the upper portion of the frame. The separation of the flange 38 from the frame section 36 need be no more than is necessary to prevent contact of the flange with the frame during the application of vulcanizing pressure and the consequent slight downward movement of the cylinder 30 and its supporting assembly in response to the pressure applied thereto. It has been found that an upward movement of the cylinder relatively to the frame 36 of about ⅛" is adequate.

In the operation of the illustrated organization the rack 54 is moved to the left, for example, by hydraulic pressure, to move the shoe form 10 downwardly into the molding station, and upon the completion of such movement of the shoe form, to elevate the cylinder 30 slightly from the frame section 36 so that the cylinder and its supporting mechanism are supported solely by the cross head 22. Thereupon, the side mold members 12 are advanced into their closed position, the welt plates 14 being slightly impressed into the upper of a shoe on the form 10 to complete the closure of the mold cavity. After the mold cavity is fully closed, fluid pressure in the cylinder 30 acts against the piston 32 to elevate the bottom mold member 16, causing it to exert heavy pressure on the charge in the mold cavity. Inasmuch as the shoe form 10 is supported by the extensions 24 of the machine frame during the vulcanizing operation while the cylinder 30 is supported by the assembly on which the shoe form is mounted, any slight downward movement of the cylinder caused by the heavy fluid pressure between the cylinder and the piston cannot cause an upward movement of the shoe form 10. Consequently, there is no danger of an upward displacement of the shoe form 10 relatively to the welt plates 14 with consequent damage to a shoe on the form.

Having thus described my invention, what I claim as new and desire to secure by Letters Patent of the United States is:

1. In a molding machine the combination with a shoe support, side mold members and a bottom mold member, of a carriage for mounting the shoe support, a first fixture for positively supporting the carriage, a pressure fluid operated piston for imparting upward movement to the bottom mold member, a cylinder in which the piston operates, a second fixture in which the cylinder is slidably mounted and on which the cylinder is supported in its rest position, extensions depending from the cylinder, and an actuator having a central shaft journaled in said extensions and having an eccentric shaft journaled in said carriage, said actuator operating first to move the carriage downwardly into a position in which it is supported upon the first fixture and thereafter to elevate the cylinder from the second fixture thereby to transfer the support of the cylinder from the second fixture to the carriage.

2. In a molding machine the combination with side mold members, a bottom mold member and a shoe form vertically movable between a rest position and an operative position, of an assembly including an upper cross head for supporting the shoe form, a first fixture for supporting the assembly by its upper cross head when the shoe support is in its operative position, a pressure fluid operated piston for imparting upward movement to the bottom mold member, a cylinder in which the piston operates, a second fixture in which the cylinder is slidably mounted and on which the cylinder is supported in its rest position, a crank mechanism having bearings in extensions of the cylinder, a bearing block mounted on the crank mechanism in eccentric relation to the bearings of the crank mechanism in the cylinder, a lower cross head forming a part of said assembly and having a guideway in which the bearing block is slidably mounted, and means for operating the crank mechanism first to move the assembly downwardly into a position in which it is supported by the first fixture and thereafter to move the cylinder upwardly thereby to transfer the support of the cylinder from the second fixture to the assembly.

3. In a molding machine, the combination with a shoe support, side mold members and a bottom mold member of a carriage comprising an upper supporting member, a lower supporting member and means interconnecting said supporting members, said shoe support being mounted on the upper supporting member, a first fixture for supporting the assembly by engagement with the upper supporting member, a pressure fluid operated piston for imparting upward movement to the bottom mold member, a cylinder in which the piston operates, a second fixture in which the cylinder is slidably mounted, means incorporated in the cylinder whereby the cylinder in its rest position is supported on the second fixture, said cylinder having bearing members incorporated therein, and a crank having a first bearing in said bearing members and a second bearing in the lower supporting member, whereby said crank operates first to move the carriage downwardly into a position in which it is supported by the engagement of the upper supporting member with the first fixture, and operates thereafter to elevate the cylinder from the second fixture thereby to transfer the support of the cylinder from the second fixture to the lower supporting member.

References Cited in the file of this patent

UNITED STATES PATENTS

| | | |
|---|---|---|
| 2,209,404 | Lassman | July 30, 1940 |
| 2,866,227 | Davidson | Dec. 30, 1958 |

FOREIGN PATENTS

| | | |
|---|---|---|
| 640,366 | Great Britain | Sept. 15, 1948 |